United States Patent [19]
Pashley et al.

[11] Patent Number: 5,529,690
[45] Date of Patent: Jun. 25, 1996

[54] FORMATION OF POROUS MATERIALS

[75] Inventors: Richard M. Pashley, Aranda; Barry W. Ninham, Cook; Stephen T. Hyde, Lyneham; Marilyn E. Karaman, Chisholm; Richard A. Morris, Grose Wold, all of Australia

[73] Assignees: The Australian National University, Australian Capital Territory; Memtec Ltd., New South Wales, both of Australia

[21] Appl. No.: 960,404
[22] PCT Filed: Jul. 2, 1991
[86] PCT No.: PCT/AU91/00285
  § 371 Date: Mar. 11, 1993
  § 102(e) Date: Mar. 11, 1993
[87] PCT Pub. No.: WO92/01506
  PCT Pub. Date: Feb. 6, 1992

[30] Foreign Application Priority Data

Jul. 18, 1990 [AU] Australia .................. PK1234/90
Jul. 18, 1990 [AU] Australia .................. PK1235/90

[51] Int. Cl.⁶ ........................................ B01D 69/00
[52] U.S. Cl. ............... 210/490; 210/500.35; 210/500.42
[58] Field of Search ........................ 210/500.42, 490, 210/500.35, 651, 654, 652; 264/41, 49; 427/245, 246

[56] References Cited

U.S. PATENT DOCUMENTS

| | | | |
|---|---|---|---|
| 3,615,024 | 10/1971 | Michaels | 210/500.42 X |
| 3,875,067 | 4/1975 | DeSorgo et al. | 250/527 |
| 4,006,069 | 2/1977 | Hiratsuka et al. | 204/180 G |
| 4,432,920 | 2/1984 | Ishikawa et al. | |
| 4,705,636 | 11/1987 | Small et al. | 210/638 |
| 5,120,440 | 6/1992 | Nemoto et al. | 210/500.42 X |
| 5,151,217 | 9/1992 | Price et al. | |

FOREIGN PATENT DOCUMENTS

| | | |
|---|---|---|
| 0449450 | 2/1991 | European Pat. Off. |
| 9007545 | 12/1990 | WIPO |

*Primary Examiner*—Frank Spear
*Attorney, Agent, or Firm*—Sughrue, Mion, Zinn, Macpeak & Seas

[57] ABSTRACT

An asymmetric or double-sided porous material, which comprises at least one porous layer of a polymer on a porous support or carrier, where the polymer is formed from a self-assembled microstructured liquid. A method of producing the same comprising positioning the support or carrier against or adjacent an inert surface, providing an excess of polymerisable liquid to completely wet the carrier and form a film through capillary action between the carrier and the inert surface and penetrating the carrier, then polymerising the liquid.

14 Claims, 2 Drawing Sheets

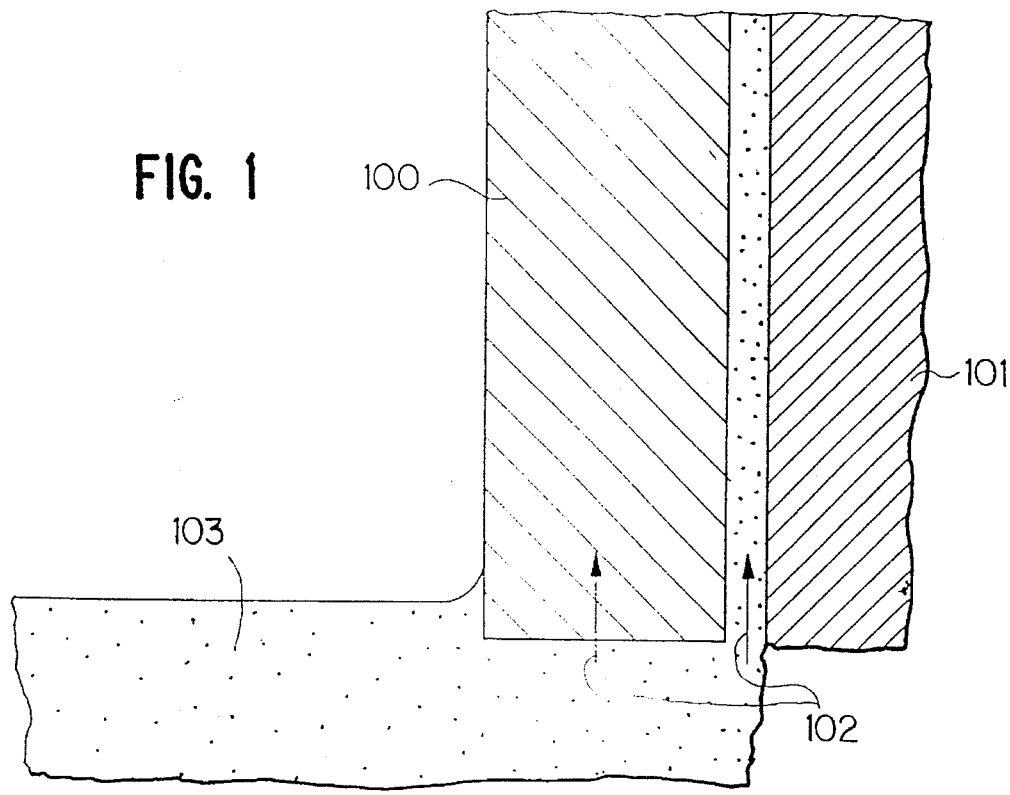
FIG. 1
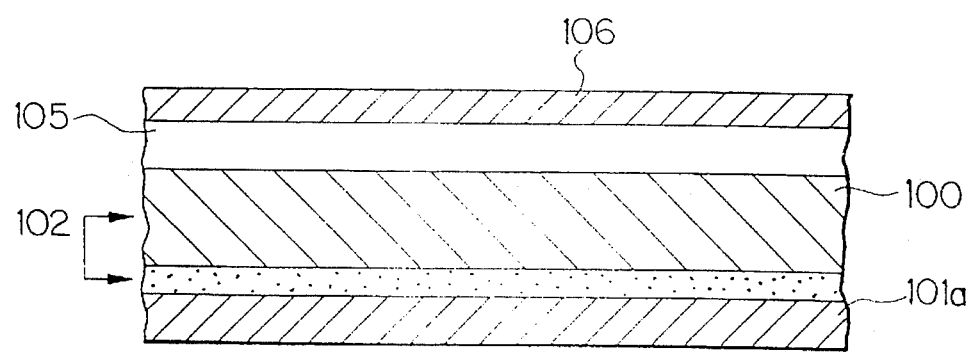
FIG. 1a
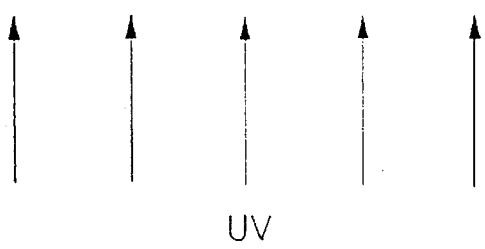

FORMATION OF POROUS MATERIALS

This invention relates to the formation of polymeric coatings on a support or carrier. The invention is especially concerned with the formation of coatings of porous material from self-assembled microstructured liquids suitable for use in microfiltration, ultrafiltration and reverse osmosis.

Hitherto, such porous materials have been prepared by either spinodal decomposition or phase inversion techniques. Membranes produced by these techniques suffer from a number of disadvantages in relation to structure and, moreover, these techniques can only be applied to a limited number of materials.

As the invention is particularly concerned with self assembled microstructured liquids, it is appropriate to discuss such liquids.

Although hydrophobic liquids such as oil and hydrophilic liquids such as water do not normally mix they can do in the presence of an amphiphilic substance such as surfactant. For the sake of convenience, the hydrophobic component will hereinafter be termed an oil and the hydrophilic component will be termed water. Depending on concentration of components, an oil/water/surfactant mixture can form an emulsion. Such an emulsion may be a water-in-oil emulsion where usually water is the dispersed phase and oil is the continuous phase or an oil-in-water emulsion where oil is the dispersed phase and water is the continuous phase. These emulsions are opaque systems because the size of the droplets cause scattering of light at a wavelength of the same order of light itself.

A surfactant is characterised by a hydrophilic head group and a hydrophobic tail group. The tail group usually consists of a single paraffinic hydrocarbon type of chain but may be more complex. The present invention is particularly concerned with surfactants in which the tail group is a double chain which is usually sparingly soluble in both oil and water.

The amphiphilic nature of surfactant molecules leads to self-aggregation in solution as the surfactant molecules isolate hydrophobic regions from hydrophilic regions. For certain concentrations of oil, surfactant and water, the mixture surprisingly becomes clear and sometimes colourless which, on a scale of the wave length of light, indicates that the mixture is a homogeneous solution. The apparently homogeneous solution exhibits a fixed, quantifiable structure on the microscopic scale and this structure forms spontaneously.

In this specification, these thermodynamically stable clear solutions are called microemulsions. Although the invention will, in the main, be described in relation to ternary systems which form microemulsions, it is to be understood that the invention is not limited thereto as other systems and other microstructured liquids will be useful. For example, certain binary systems such as methyl methacrylate and hexadecane or polymerisable surfactant and water may be used to form porous material as may quaternary and other multi-component systems which can include salt, mixtures of oil, mixed surfactants as well as polymeric additives to an oil or water.

Such mixtures are said to exhibit a self-assembled microstructure and often consist of bicontinuous phases separated by a surfactant monolayer or bilayer (they may, however, consist of disconnected spheres of water-in-oil or vice versa). When the bicontinuous phases are separated by a surfactant monolayer, one phase (or sub-volume) is an oil phase and the other phase is an aqueous phase. When the bicontinuous phases are separated by a surfactant bilayer, both labyrinths are either both oily or both aqueous and the space between the surfactant bilayer may be swelled respectively by the inclusion of water or of an oil.

In self-assembled microstructures, the surface formed by the surfactant achieves a shape which complies with established thermodynamic laws and which represents a global or local minimum energy which fulfils both global and local packing constraints required for the surfactant molecules. The constraints on a particular surfactant depend on the nature of the oil or water. For example, a short chain alkane like hexane will penetrate more strongly into the hydrocarbon surfactant tails than will a long chain alkane such as dodecane and impose on the formed surfactant film more curvature than the latter.

In the case of an oil/water/surfactant system, curvature is set by a balance of three forces. These are: the repulsive head-group forces, the hydrophobic attraction between the tails in water and a repulsive force acting between the hydrocarbon tails constrained by the interface.

The homogeneous and optically transparent mixtures lie in single phase regions of the phase diagram of the multicomponent system. These single phases may be of a crystalline nature (such as lamellar, hexagonal or cubic) which indicates an ordered compartmentisation of components in the mixture with a geometrically regular and repeated structure or a non-crystalline microemulsion in which compartmentisation is random and isotropic. The invention is particularly but not exclusively concerned with water-continuous structures containing well-defined pores such as microemulsions and the cubic phases. It also includes inverted micelle phases.

In general, cubic phase mixtures form viscous gels, which are optically isotropic. The mixture forms a partitioning into oil, water and surfactant regions which lie on a three-dimensional lattice of cubic symmetry (body-centred cubic, face-centred cubic or simple cubic). This can be established by small-angle X-ray or neutron scattering. Theoretical studies indicate that in bi-continuous cubic phases, the surfactant forms one of two possible structural classes.

In one of these (herein termed a class I structure), normal oil-swollen bilayers lie on a periodic cubic minimal surface. The oil-swollen bilayer forms a thin film on the surface and the surfactant head groups plus water form two interpenetrating tunnel networks separated by the bilayers. While symmetry is cubic, the topology of the underlying unit cell of the lattice can be very complex.

The other class of structure (herein termed a class II structure) consists of reversed water-swollen bilayers with the oil forming the interpenetrating tunnels and with hydrophobic moiety (head groups and water) lying on a cubic minimal surface.

For aqueous separations, the first class of structure is important, since the water networks consist of geometrically ordered interconnected pores of well-defined sizes such as diameters in the range 5–200Å.

For hydrophobic separations (such as the cleaning of organic solutions), the second class of structure is of interest.

Cubic phases are of interest because the tunnel sizes are very well defined due to the crystalline morphology and because the pore space can be enormous, in some cases greater than 90% by volume of the total volume, allowing for high flow rates.

The microstructure within a cubic phase can vary with composition throughout the phase. The symmetry of the structure (that is the lattice symmetry) can change such as from face-centred cubic to body-centred cubic. Also, the topology (that is, the number of pore tubes per unit cell) may vary.

Microemulsions are non-viscous optically isotropic transparent mixtures which are thermodynamically stable. They are single phase mixtures which give rise to a single broad peaks in small-angle scattering due to a characteristic length scale typically 5–200Å.

Many microstructures can occur within the general class of microemulsion structures. Typically, they may consist of micelles or reverse micelles (spheres formed by a monolayer of surfactant molecules which contain water or oil respectively) arranged randomly in the water or oil. The microstructures may also be interconnected monolayer films of surfactant, forming random (i.e. no crystalline lattice) surfaces of constant mean curvature, which can be visualised loosely as spheres placed randomly in space and joined to other closeby spheres by cylinders (herein referred to as class I microemulsions). The average number of cylinders connected to a single sphere is termed the coordination number.

The microemulsion may also form bilayers laying on disordered minimal surfaces (herein called class II microemulsions).

Microstructures of inter-connected water pores can be inferred from the phase diagrams of the mixtures. A microemulsion region which forms a tear-drop shape emerging from the oil corner of the ternary phase diagram (typical of class I microemulsions curved towards water) is of particular importance to the invention.

For microemulsions consisting of monolayers of surfactant forming random surfaces of constant mean curvature, curved towards water, the microstructure varies continuously with composition. For example, a number of changes occur when a sample of fixed surfactant to oil ratio is diluted with water.

At the lowest water content required for the microemulsion to form, the structure consists of a highly interconnected network of tubes the diameter of which is just large enough to contain the surfactant head-groups comfortably. As water is added, the diameter increases to accommodate the extra water, but the coordination number decreases in order to retain the preferred curvature of the surfactant monolayer.

At the high-water limit of the microemulsion single-phase region, the coordination number attains its minimum (zero) and hence the structure consists of a random array of reverse micelles. The structure is water-continuous (which is essential for reverse osmosis membranes) only if the coordination number exceeds one.

Similarly, a number of changes occur when oil is added to a sample of fixed water to surfactant ratio. At the minimum oil content required for a single clear microemulsion phase to form, the spacing between the cylinder-connected spheres is just large enough to accommodate the surfactant tails. As more oil is added, the cylinders lengthen (that is, the sphere to sphere distance increases to take up the extra oil), while the sphere and cylinder radii increase slightly. In general, the coordination number does not change significantly under oil dilution, except possibly at very large oil concentrations where the structure is difficult to determine anyway.

The pore dimensions and topology or connectivity can be changed by altering the surfactant and/or oil molecular geometry as well as by altering composition. In general, the longer the chain length of the oil, the smaller the resulting film curvature, so the larger the pore size.

In cubic and microemulsion microstructures, the surfactant surface is characterised by having ordered or randomly intersecting tubes or conduits throughout, with nodular or bead-like shaped entities as at the conduit intersections. The conduits between the intersections may be straight or in a series of straight sections. The conduits may also be blind. The structures in the liquid state are, of course, dynamic.

Certain topological parameters can be used to determine the characteristics of the surface of both crystalline (e.g. cubic) and microemulsion type serf-assembled microstructures. In the case of crystalline self-assembled microstructures, many bicontinuous and related constant average curvature surfaces exist for any space group symmetry. These surfaces are distinguishable by their topology and are characterised by the genus per unit cell of the surface. Thus, symmetry alone is inadequate for structural assignation of such microstructures.

The above concepts are discussed in the literature, along with theoretical consideration and mathematical models for self-assembled microstructures (See Barnes, I. S. et al, *J. PHYS. CHEM.*, 1988, 92, 2286; Hyde, S. T. et al, *J. PHYS. CHEM.*, 1989, 93, 1464). The techniques described in these references demonstrate how the mathematical approach can be used as a systematic guide to forecast the structure of a porous material formed from a self-assembled microstructure. From the practical viewpoint, these techniques can be used to predetermine the composition of the components of the system required to produce a porous material of desired porosity and structure from inspection of the phase diagram alone.

It is one object of this invention to provide asymmetric porous materials, especially those formed from self-assembled microstructured liquids.

It is another object of this invention to provide an improved method of forming a coating on a support or carrier which can be applied to a wide variety of materials including monomers and multi-component compositions such as microemulsions and other homogeneous and optically transparent mixtures which line the single phase regions of the phase diagram of a multi-component system.

According to one aspect of the invention there is provided an asymmetric or double-sided porous material, which comprises at least one porous layer of a polymer on a porous support or carrier.

According to another aspect of the invention there is provided a porous material comprising at least one porous layer formed from a self-assembled microstructured liquid on a porous support.

According to a further aspect of the invention there is provided a method of forming a polymerised coating on a support or carrier comprising the steps of:

(i) providing an inert surface;

(ii) positioning the support or carrier against or adjacent to the surface;

(iii) providing sufficient polymerizable liquid to completely wet the support or carrier and fill the space between this and the inert surface.

(iv) allowing the polymerisable liquid to form a film through capillary action between the carrier and the inert surface and to penetrate the carrier; and (v) polymerising the liquid The support may be more porous than the coating or less active in a separation sense than the coating. Obviously, the support should not be dissolved by any component of the polymerisable liquid. Anchorage of the coating anchored to the support may occur by way of chemical adhesion, interpenetration or polymerisation, or any combination of such effects.

A wide variety of materials can be used for the support or carrier material. We have found that ordinary cellulose filter paper is a cheap and versatile substrate for this purpose, but a wide range of thin porous substrates are available to which this procedure of the invention can be easily applied. For example, more chemically resistant inorganic substrates such as porous pyrex sheets or ceramic paper, or organic substrates such as nylon/polyester mesh may be used. We have found the more pliable substrates to be easiest to handle.

The porous material of the invention may comprise a layer of the polymer on only one side of the porous support or carrier, or there may be a layer on two sides. In the latter case the above described method may involve the use of two inert surfaces, with the support or carrier positioned between them.

The method of the invention may be applied to any liquid or mixture which can be solidified. For example, the method may be applied to produce membrane products from aqueous gels made from polymerisable surfactants or from mixed-monomer polymers, both of which may produce porous solids. Even a simple mixture of a polymerisable monomer with an inert oil or hydrocarbon may give a useful product.

Most preferably, however, the polymer is formed from a self-assembled microstructured liquid, particularly a microemulsion, a bicontinuous crystalline phase, an inverted micelle microemulsion or a surfactant hydrogel.

Thus in accordance with this aspect of the invention there is provided a method of preparing a porous material from a self-assembled microstructed liquid which comprises, or is derived from;

(a) a hydrophobic substance, (b) a hydrophilic substance, and (c) an amphiphilic substance;

at least one of the substances (a) and (c) being polymerisable; said method comprising the steps of:

(i) selecting the hydrophobic substance and the amphiphilic substance so that the amphiphilic substance when swollen by the hydrophobic substance has an effective surfactant parameter (as hereinbefore described) greater than one.

(ii) selecting ratios of the three substances that will give the self-assembled microstructure;

(iii) causing or allowing the microstructure to form and allowing the surfactant molecules to self-aggregate so as to define a surfactant layer which separates the hydrophobic phase from the hydrophilic with the hydrophilic phase being an interconnection of the spherical and cylindrical voids, thereby to form the polymerisable liquid.

The hydrophobic substance may be selected from a wide variety of polymerisable materials, such as vinylic or olefinic monomers and mixtures thereof. For example, alkyl methacrylates, styrene and/or straight or branched olefins may be used. The polymerisable material may also contain one or more additional substances which act as crosslinkers, viscosifiers and initiators in the polymerisation process. The hydrophobic substance may contain a dissolved polymer for additional strength.

The hydrophilic substance may consist of water, water containing dissolved salt(s), a monohydric or polyhydric alcohol, or any other hydrophilic polar liquid.

A wide variety of materials may be used as the amphiphilic substance including anionic surfactants, cationic surfactants and non-ionic surfactants. Preferred substances for polar separation will have an effective surfactant parameter in excess of one. Preferred surfactants contain one or more hydrophobic chains. Preferably also, the surfactant is a polymerisable surfactant, more preferably containing one or more polymerisable groups.

The use of a polymerizable surfactant substantially increases the mechanical strength of these membranes and reduces leaching. This is necessary for high pressure reverse osmosis membranes.

The effective surfactant parameter provides a means of predicting curvature and hence pore dimensions in the porous material. The surfactant parameter can be varied in a systematic way and can be predicted by choice of oil, mixtures of surfactant, variation of surfactant chain length, head group or by addition of salt.

Admixing of single chain and double chain surfactants will reduce the surfactant parameter and result in larger pores. Admixing of long chain alcohols will increase the surfactant parameter and result in smaller pores provided that the surfactant parameter is greater than one. Addition of a strongly hydrated counter ion such as acetate will increase head group repulsion as compared with bromide to reduce the surfactant parameter and give larger pores provided that the surfactant parameter is greater than one.

In order that the invention may be more readily understood, reference will now be made to the accompanying drawings in which:

FIG. 1 is a schematic diagram of apparatus for forming a porous material according to one embodiment of the invention; and FIG. 1a is a schematic diagram of a similar apparatus for forming a porous material by UV polymerization.

Figure 2:
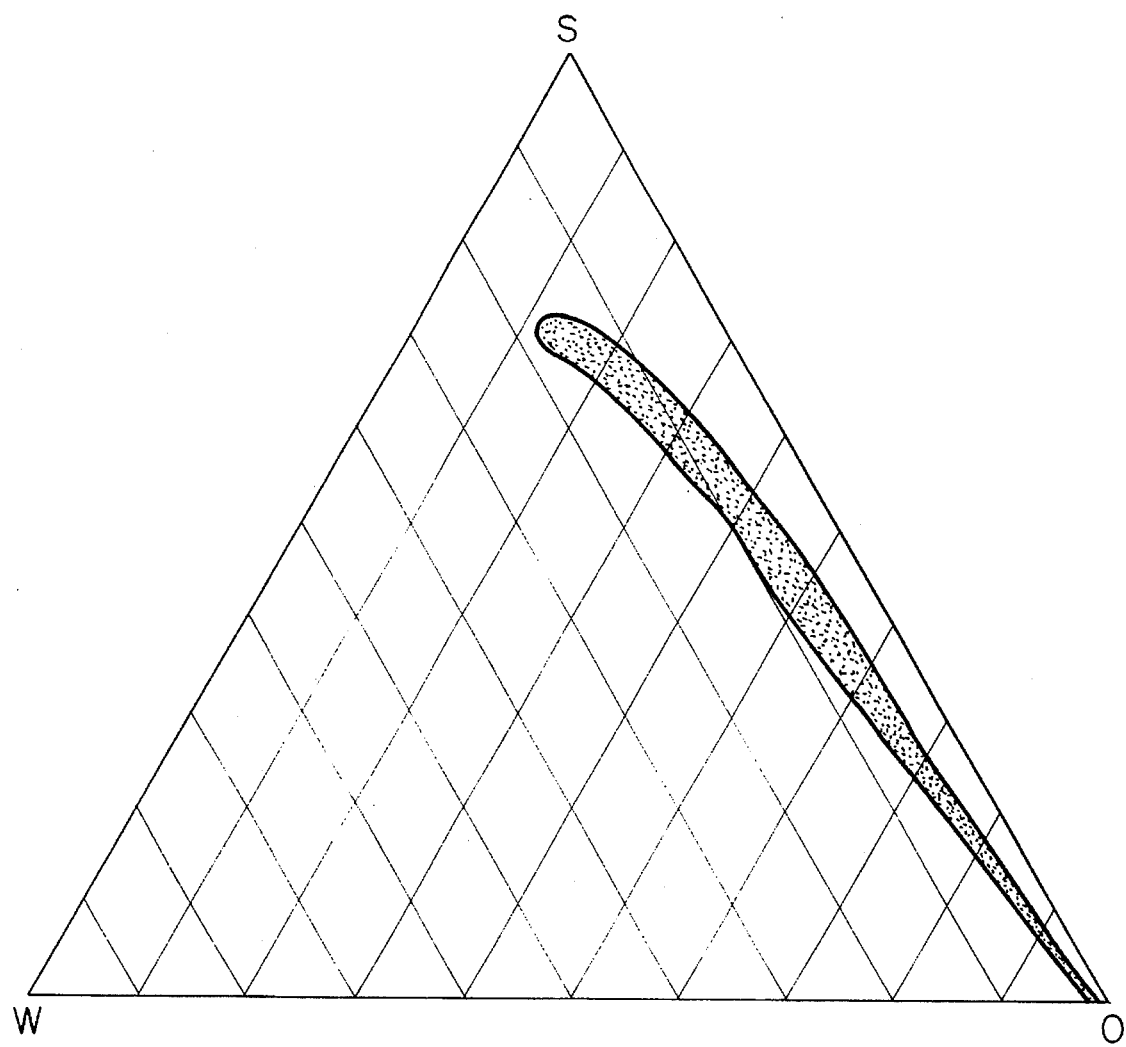
FIG. 2 is a phase diagram of a ternary oil/water/surfactant mixture which forms a self-assembled microstructured clear liquid (shaded region) useful as a polymerisable liquid in accordance with the invention.

Asymmetric membranes or porous materials from self-assembled microstructures in accordance with the invention can be produced by the procedures illustrated in FIGS. 1 and FIG. 1a.

In FIG. 1, ordinary cellulose filter paper 100 is held against a smooth inert wall 101 (e.g. steel or quartz) and then wetted by the polymerisable liquid 102. The liquid 102, which is also present as a reservoir 103 in contact with the filter paper 100, produces a uniform equilibrium wetting film between the paper 100 and the wall 101. In addition, the paper 100 remains thoroughly wetted by the liquid 102. Most liquids will produce this film as a thermodynamic state of equilibrium. Even viscous liquids such as the cubic phase, given time, will attain the same state. It is advantageous to maintain vapour equilibrium to avoid changes in the composition of the mixture.

Once this state is achieved, the mixture can be polymerised to produce an asymmetric membrane. Thermal polymerisation is perhaps, the simplest procedure but UV irradiation through a silica or quartz wall (such as 101a) will produce the same result and, in general, more quickly (see FIG. 1a). After polymerisation the membrane can be pulled off the wall relatively easily. Techniques, such as rapid cooling or heating of the wall facilitate this process as does pre-coating of the walls with a thin layer of silicone oil.

The membrane, once peeled away, generally has a similar degree of smoothness to the wall and may even retain the fine structure of the wall surface.

The arrangement shown in FIG. 1a is generally similar to that of FIG. 1. The inert wall 101a is a quartz plate and the apparatus includes a thin clear polypropylene sheet 105 (to reduce evaporation) and a rigid, thin aluminum sheet 106 to enable the whole assembly to be clamped together.

In one experiment, using methyl methacrylate as a polymerisable oil in a microemulsion, the wall 101 had a surface of stainless steel 316 machined with a sharply pointed tool to produce an undulating surface with a period of 200 micrometers. The resulting composite sheet had a high degree of polymerisation in the skin-layer and a more open structure in the cellulose support. This was illustrated by the observation that polymerisation of various liquids (e.g. methylmethacrylate) dram into filter paper held away from the wall, allowed water to flow through relatively easily when under pressure of a few atmospheres. However, using the same liquid against a wall produced a skin layer which is completely impervious to water at 7 atm. In addition, the macroporous support layer can be leached with a suitable solvent (e.g. ethanol) to further open up these pores for improved flow.

Replacement of the pure monomer with a polymerisable microemulsion liquid mixture (e.g. 26% methyl methacrylate as the polymerisable oil, 1% benzoyl peroxide as initiator, 3% ethylene glycol dimethacrylate as cross linking agent, 30% water and 40% Aerosol-OT surfactant) produced a more opaque membrane with a similar skin-layer, asymmetric structure. Typical thermal polymerisation conditions are 55° C. for 20 hr. The composition was investigated by testing its conductivity and was found to be bicontinuous before polymerisation.

This product had a more waxy feel, especially on the porous support side and surfactant can obviously be leached out in water. This material has some of the characteristics of an ultrafilter.

An example of the UV polymerization process used 4% methylmethacrylate as polymerizable oil, 1% benzoin and 1% benzoin methyl ether as initiators, 9% ethylene glycol dimethacrylate as cross linking agent, 8% water and 40% didodecyl dimethyl ammonium bromide (DDAB) surfactant. In this region of the phase the clear liquids gave x-ray microstructure which was retained upon polymerisation. The membranes produced had similar characteristics to the AOT (thermal) membrane.

The thermal experiments were carried out in a sealed container charged with nitrogen to prevent oxygen inhibition to polymerisation of the methyl methacrylate.

Double-sided membranes or porous materials may be produced by a modification of the apparatus of FIG. 1a in which the sheets 105 and 106 are replaced by a second quartz plate. Using this arrangement, the liquid (102) can be made to wet both sides of the paper (100).

The following example further illustrates the invention.

PART 1. SYNTHESIS OF $C_{11}$—$C_2$ DI-POLYMERIZABLE SURFACTANT (Compound A)

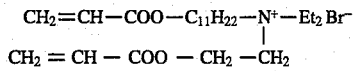

30 g of 11-bromo-1-undecanol was mixed with 14 g of 2-diethylaminoethanol [$Et_2NCH_2CH_2OH$] and refluxed in acetone for about 10 days. The reaction mixture was then rotary-evaporated after thin-layer chromatography (TLC) indicated that only a small amount of the reactants were still present. 22 g of an off-white solid was obtained which on NMR analysis appeared to be the reasonably pure compound:

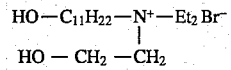

20 g of this solid were mixed with a threefold excess of methacryloyl chloride ($CH_2$=CH—COCl) in about 100 ml of chloroform. This mixture was refluxed for three days after which TLC examination indicated completion of the reaction. After rotary evaporation of the reaction mixture, NMR analysis of the solid product indicated that the product was reasonably pure Compound A. About 28 g of this material was obtained. It was used without further purification.

PART 2. DETERMINATION OF MICROEMULSION REGION.

FIG. 2 is a phase diagram of a ternary oil/water/surfactant, mixture which forms a self-assembled microstructured clear liquid (shaded region) useful as a polymerizable liquid in accordance with the invention. The surfactant(s) is compound A, "W" is pure water and "O" is a mixture of polymerizable oils of composition: methylmethacrylate (32%), 1-hydroxy ethylmethacrylate (42%) and ethylene glycol di-methacrylate (26%). The phase diagram was determined at 25° C. Information from the phase diagram was used to establish the composition used in the next part of the example.

PART 3. MEMBRANE FORMATION (Typical Method)

Using Compound A, a clear liquid mixture was obtained using the composition shown below

| Material | (by wt) | Actual |
| --- | --- | --- |
| Compound A | 70% | 69.78% |
| Methyl methacrylate | 4.9% | 4.47% |
| Ethylene glycol dimethacrylate | 3% | 3.10% |
| 1-hydroxyethylmethacrylate | 4% | 4.59% |
| Water | 17% | 17.05% |
| Benzoin | 1% | 0.73% |
| Benzoin methyl ether | 1% | 0.50% |

The mixture was briefly shaken using an automatic vibrator at room temperature and then left to stand for several minutes. About 2 ml of this mixture was used to produce an 8×8 cm membrane as follows. Whatman No. 1. filter paper was cut to this size and the mixture was applied to one side of a clean, smooth quartz plate. The paper was immediately placed on to the treated plate and smeared out to produce complete wetting and adhesion of the paper to the plate with no trapped air bubbles. A thin, clear polypropylene sheet was then placed over the wetted filter paper (to reduce evaporation) and pressed again to remove trapped air. This sheet was then covered with rigid, thin aluminium sheet and clamped firmly to the quartz plate (See FIG. 1a).

The clamped assembly was then held vertically in an Oliphant UV irradiation chamber and irradiated for about 30 minutes at room temperature. The sheet of aluminium was then removed and the polypropylene sheet peeled off. The membrane could then be gently lifted off the quartz substrate and post-cured in a sealed bag at room temperature for 24 hours.

PART 4. MEMBRANE TESTING—Salt Rejection Levels.

A piece of the membrane (a disc 39 mm diameter, i.e. 12.5 cm$^2$ area) was tested for salt rejection in a reverse osmosis (RO) test cell, with the active side of the membrane facing the feed.

Permeate was collected from the cell and the conductivity of the permeate and the feed are compared to ascertain the level of salt rejection.

To check the integrity of the test system two conventional reverse osmosis membranes were assessed for their salt rejection capabilities.

RESULTS

Conventional Reverse Osmosis Membranes (DESAL membrane—Separation systems).

DS5 = 82% rejection of NaCl (0.5 g/Liter)
Filtrate = 2304 Liters/day/1000 PSI/m$^2$
= 56 U.S. gallons/day/1000 PSI/ft$^2$
DS3 = 95% rejection of NaCl (0.5 g/Liter)
Filtrate = 1479 Liters/day/1000 PSI/m$^2$
= 36 U.S. gallons/day/1000 PSI/ft$^2$ Invention membrane. (Samples (A) and (B) are made from the same composition. (See Part 3)

(A)  1st run = 20% rejection of MgCl$_2$ (0.5 g/Liter)
     2nd run = 26% rejection of MgCl$_2$ (0.5 g/Liter)
     Filtrate = 50.5 Liter/day/1000 PSI/m$^2$
     = 1.2 U.S. gallons/day/1000 PSI/ft$^2$
(B)  1st run = 6% rejection of MgCl$_2$ (0.5 g/Liter)

We claim:

1. A method of forming a layer of a polymeric porous material on a porous support or carrier comprising the steps of:
   (i) providing an inert surface;
   (ii) positioning the support or carrier against or adjacent to the inert surface;
   (iii) providing an excess of a polymerizable liquid to completely wet the support or carrier and fill the space between the support or carrier and the inert surface;
   (iv) allowing the polymerizable liquid to form a film through capillary action between the support or carrier and the inert surface and to penetrate the support or carrier; and
   (v) polymerizing the liquid by radical polymerization to form said layer,
wherein said polymerizable liquid is a self-assembled microstructured liquid which comprises, or is derived from, a mixture comprising:
   (a) a hydrophobic substance comprising at least one polymerizable monomer selected from the group consisting of vinylic monomers, olefinic monomers and acrylate monomers;
   (b) a hydrophilic substance selected from the group consisting of water, water containing dissolved salts, a monohydric alcohol and a polyhydric alcohol; and
   (c) an amphiphilic substance selected from the group consisting of anionic surfactants, cationic surfactants and non-ionic surfactants, wherein said surfactants have two or more hydrophobic chains and contain one or more polymerizable groups.

2. The method as claimed in claim 1, further comprising the steps of:
   (i) selecting the hydrophobic substance and the amphiphilic substance so that the amphiphilic substance when swollen by the hydrophobic substance has an effective surfactant parameter greater than one;
   (ii) selecting ratios of substances (a), (b) and (c) that will give the self-assembled microstructure; and
   (iii) causing or allowing the microstructure to form and allowing the surfactant molecules to self-aggregate so as to define a surfactant layer which separates the hydrophobic phase from the hydrophilic phase.

3. The method as claimed in claim 1, wherein said polymerizable monomer is an alkyl methacrylate, styrene or a straight or branched olefin.

4. The method as claimed in claim 1, wherein said polymeric porous material has a pore size in the range of 5 to 200Å.

5. The method as claimed in claim 1, wherein the self-assembled microstructured liquid is a microemulsion, a bicontinuous crystalline phase, an inverted micelle microemulsion or a surfactant hydrogel.

6. The method as claimed in any one of claims 1 or 5, wherein said hydrophobic substance (a) also contains at least one dissolved polymer.

7. The method as claimed in claim 6, wherein said hydrophobic substance (a) contains one or more additional substances which act as crosslinkers, viscosifiers and initiators in the polymerization.

8. An asymmetric or double-sided porous material which comprises at least one porous layer of a polymer on a porous support or carrier, wherein said polymer is formed by radical polymerization of a self-assembled microstructured liquid which comprises, or is derived from, a mixture comprising:
   (a) a hydrophobic substance comprising at least one polymerizable monomer selected from the group consisting of vinylic monomers, olefinic monomers and acrylate monomers;
   (b) a hydrophilic substance selected from the group consisting of water, water containing dissolved salts, a monohydric alcohol and a polyhydric alcohol; and
   (c) an amphiphilic substance selected from the group consisting of anionic surfactants, cationic surfactants and non-ionic surfactants, wherein said surfactants have two or more hydrophobic chains and contain one or more polymerizable groups.

9. The asymmetric or double-sided porous material as claimed in claim 8, wherein said self-assembled microstructured liquid is a microemulsion, a bicontinuous crystalline phase, an inverted micelle microemulsion or a surfactant hydrogel.

10. The asymmetric or double-sided porous material as claimed in claim 8, wherein said polymerizable monomer is an alkyl methacrylate, styrene or a straight or branched olefin.

11. The asymmetric or double-sided porous material as claimed in claim 8, wherein said porous layer has a pore size in the range of 5 to 200Å.

12. The asymmetric or double-sided porous material as claimed in any one of claims 8, 9 or 10, wherein said hydrophobic substance (a) also contains at least one dissolved polymer.

13. The asymmetric or double-sided porous material as claimed in claim 12, wherein the hydrophobic substance (a) contains one or more additional substances which act as crosslinkers, viscosifiers and initiators in the polymerization.

14. The asymmetric or double-sided porous material as claimed in claim 8, wherein
   (i) the amphiphilic substance when swollen by the hydrophobic substance has an effective surfactant parameter greater than one,
   (ii) the ratios of substances (a), (b) and (c) give the self-assembled microstructure, and
   (iii) the microstructure forms to allow the surfactant molecules to self-aggregate so as to define a surfactant layer which separates the hydrophobic phase from the hydrophilic phase.

* * * * *